(12) United States Patent
Lee et al.

(10) Patent No.: US 10,877,280 B1
(45) Date of Patent: Dec. 29, 2020

(54) WAVEGUIDE DISPLAY WITH HOLOGRAPHIC BRAGG GRATING

(71) Applicant: Facebook Technologies, LLC, Menlo Park, CA (US)

(72) Inventors: Hee Yoon Lee, Kirkland, WA (US); Wanli Chi, Sammamish, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/582,135

(22) Filed: Sep. 25, 2019

Related U.S. Application Data

(63) Continuation of application No. 15/864,859, filed on Jan. 8, 2018, now Pat. No. 10,473,939.

(51) Int. Cl.
| | | |
|---|---|---|
| *G02B 6/293* | (2006.01) | |
| *G02B 27/01* | (2006.01) | |
| *F21V 8/00* | (2006.01) | |
| *G02B 27/09* | (2006.01) | |
| *G06F 3/01* | (2006.01) | |

(52) U.S. Cl.
CPC ....... *G02B 27/0172* (2013.01); *G02B 6/0016* (2013.01); *G02B 6/29304* (2013.01); *G02B 27/0103* (2013.01); *G02B 27/0944* (2013.01); *G02B 2027/0123* (2013.01); *G02B 2027/0174* (2013.01); *G02B 2027/0178* (2013.01); *G06F 3/011* (2013.01)

(58) Field of Classification Search
None
See application file for complete search history.

(56) References Cited

U.S. PATENT DOCUMENTS

| | | | | |
|---|---|---|---|---|
| 2014/0104665 | A1* | 4/2014 | Popovich | G02B 27/0081 359/15 |
| 2015/0125109 | A1* | 5/2015 | Robbins | G02B 27/0172 385/10 |
| 2017/0285349 | A1* | 10/2017 | Ayres | G02B 27/0172 |
| 2018/0074457 | A1* | 3/2018 | Jolly | G03H 1/0248 |
| 2018/0284440 | A1* | 10/2018 | Popovich | G02B 27/0093 |
| 2019/0004219 | A1* | 1/2019 | Tervo | G02B 27/0081 |

* cited by examiner

*Primary Examiner* — Tony O Davis
(74) *Attorney, Agent, or Firm* — Fenwick & West LLP

(57) ABSTRACT

A near-eye display includes a light source assembly, a first waveguide, an output waveguide, and a controller. The light source assembly emits image light including light within a first band and a second band. The first waveguide receives the image light, expands the received image light in at least one dimension, and outputs an image light. The output waveguide includes an output area and a plurality of input areas. Each input area receives the image light from the first waveguide. The output waveguide includes a holographic Bragg grating and the output waveguide expands the image light at least along two dimensions to form an expanded image light, and outputs the expanded image light toward an eyebox. The controller controls the scanning of the light source assembly and the first waveguide.

15 Claims, 7 Drawing Sheets

WAVEGUIDE DISPLAY WITH HOLOGRAPHIC BRAGG GRATING

CROSS REFERENCE TO RELATED APPLICATIONS

This application is a continuation of co-pending U.S. application Ser. No. 15/864,859, filed Jan. 8, 2018, which is incorporated by reference in its entirety.

BACKGROUND

The disclosure relates generally to near-eye-display systems, and more specifically to waveguide displays that use holographic Bragg gratings.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems have a design criteria to be compact and light weight, and to provide a two-dimensional expansion with a large eyebox and a wide field-of-view (FOV) for ease of use. In typical NEDs, the limit for the FOV is based on satisfying two physical conditions: (1) an occurrence of total internal reflection of image light coupled into a waveguide and (2) an existence of a first order diffraction caused by a diffraction grating element. Conventional methods used by the NEDs based on a diffraction grating rely on satisfying the above two physical conditions in order to achieve a large FOV (e.g. above 40 degrees) by using materials with a high refractive index, and thus, adds significantly heavy and expensive components to the NEDs. Specifically, in NEDs with waveguide display systems utilizing surface-relief grating elements, more than one waveguide is used for a full-color display because a single grating element with a single grating pitch cannot couple or decouple more than one channel without affecting the substantially large FOV of the NEDs. Accordingly, such NEDs scale up in thickness and weight with the number of channels and the number of planes for a multi-planar display. Furthermore, designing a conventional NED with two-dimensional expansion involving surface-relief grating elements not only diffract a light in-coupled into the waveguide but also diffract the light external to the NED towards the user's eyes, and generate undesirable ghost images.

SUMMARY

A waveguide includes a waveguide body with a top surface, a bottom surface that is opposite to the top surface, and one or more input surfaces, a plurality of input areas located along the one or more input surfaces, and an output area located along the bottom surface. The waveguide body includes a holographic Bragg grating generated using a plurality of exposures within a recording band. In some configurations, the recording band is in a ultra-violet band of light. The plurality of exposures are such that the holographic Bragg grating diffracts light in one or more bands of light (e.g., different portions of a visible band) that are at a longer wavelength than the recording band. Each of the plurality of input areas receives an image light from a light source assembly.

Embodiments relate to a near-eye display used for presenting media to a user. The near-eye display includes a light source assembly, a first waveguide, an output waveguide, and a controller. The light source assembly emits image light including light within a first band (e.g., red light) and light within a second band (e.g., green light) different from the first band. In some embodiments, the light source assembly may include at least one other band of light that is different from the first and second band.

The first waveguide receives the image light from the light source assembly at an entrance area, expands the received image light in at least one dimension, and outputs an image light from the exit area. The output waveguide includes an output area along a first plane and a plurality of input area along a second plane different from the first plane. Each of the plurality of input areas receives the image light. In some configurations, the output waveguide includes a top surface, a bottom surface that is opposite to the top surface where the output area is located, and one or more input surfaces where the plurality of input areas are located. The output waveguide includes a holographic Bragg grating.

The output waveguide expands the scanned image light at least along one dimension to form an expanded image light. The holographic Bragg grating outputs the expanded image light toward an eyebox. The controller controls the scanning of the light source assembly and the first waveguide based on display instructions to form a two-dimensional image. In some embodiments, the near-eye display includes a scanning mirror that receives an expanded image light from the first waveguide and reflects a scanned image light towards the output waveguide. In some configurations, the first waveguide may be positioned at a fixed orientation with respect to the output waveguide.

In a different embodiment, the first waveguide includes a holographic Bragg grating generated using exposures within the recording band, and the output waveguide expands the image light received from the light source assembly at least along a second dimension orthogonal to the first dimension to form an expanded image light.

In some embodiments, the holographic Bragg grating is generated using a plurality of exposures within a recording band different from the first band, the second optical band, or the third optical band. In some embodiments, the plurality of exposures are such that for angles of incidence within a first range of angles, the holographic Bragg grating diffracts incident light (e.g., that is in the first optical band, the second optical band, and/or the third optical band) to corresponding angles of a second range of angles. For example, if the light (e.g., in the first band, the second band, and/or the third band) is incident on the holographic Bragg grating at a first angle, of the first range of angles, the holographic Bragg grating diffracts the incident light at a second angle, of the second range of angles, and out-couples the diffracted light from the output waveguide. Accordingly, light in different optical bands that are incident at the same angle can be diffracted by the holographic Bragg grating at a same angle.

Figure 1:
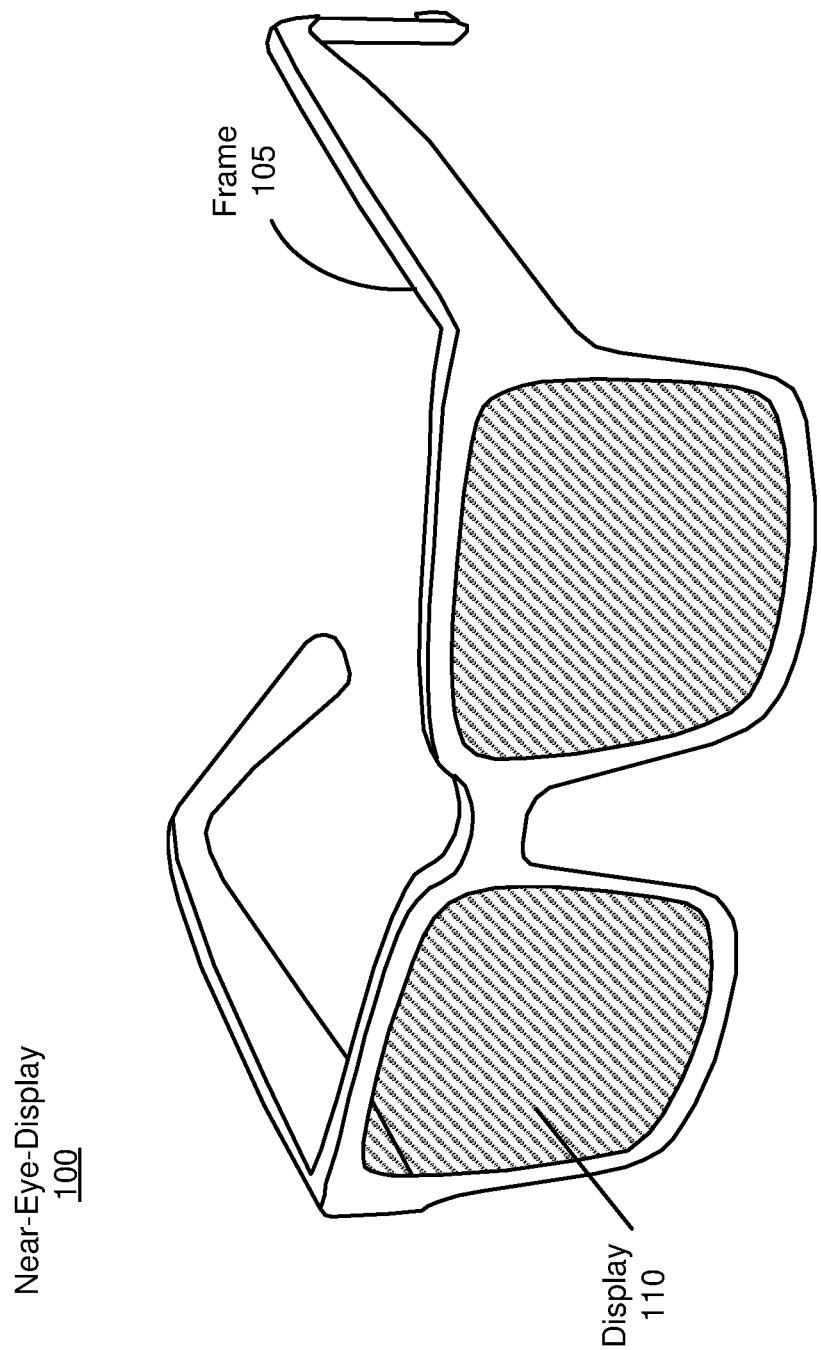
FIG. 1 is a diagram of a NED, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A waveguide includes a waveguide body with a top surface, a bottom surface that is opposite to the top surface, and one or more input surfaces, a plurality of input areas located along the one or more input surfaces, and an output area (e.g. X-Y plane) located along the bottom surface closer to the user's eyes. The waveguide body includes a holographic Bragg grating generated using a plurality of exposures within a recording band (e.g. ultra-violet light with optical wavelength in the range of 10 nm to 400 nm). In one embodiment, a near-eye display includes a light source assembly, a scanning waveguide (also referred to as "first waveguide"), an output waveguide, and a controller. The light source assembly emits image light including light within a first band, light within a second band different from the first band, and light within a third band different from the first band and the second band. The scanning waveguide receives the image light from the light source assembly at an entrance area, expands the received image light in at least one dimension, and outputs a scanned image light from the exit area to the output waveguide. In some embodiments, the near-eye display includes a scanning mirror that receives an expanded image light from the first waveguide and reflects a scanned image light towards the output waveguide.

The output waveguide includes an output area along a first plane and an input area along a second plane. Each input area receives the scanned image light. In some configurations, the output waveguide includes a top surface, a bottom surface where the output area is located, and one or more surfaces where the input area is located. The output waveguide includes a holographic Bragg grating generated using a plurality of exposures within a recording band (e.g. ultra-violet light with wavelength ranging from 10 nm to 400 nm).

The plurality of exposures may be such that, for different angles of incidence within a first range of angles, the holographic Bragg grating diffracts incident light to corresponding angles of a second range of angles. In a first embodiment, if the light (e.g., in the first band, the second band, and/or the third band) is incident on the holographic Bragg grating at a first angle, of the first range of angles, the holographic Bragg grating diffracts the incident light at a second angle, of the second range of angles, and out-couples the diffracted light from the output waveguide. In some embodiments, the plurality of exposures with different Bragg conditions are done such that light in different optical bands that are incident at the same angle can be diffracted by the holographic Bragg grating at a same angle. In some embodiments, if the light is incident on the holographic Bragg grating at a plurality of angles within the first range of angles, the holographic Bragg grating diffracts the incident light at a second angle, and out-couples the diffracted light from the output waveguide. Therefore, light in different optical bands that are incident at different angles can be diffracted by the holographic Bragg grating at the same angle. The output waveguide expands the scanned image light at least along one dimension to form an expanded image light, and outputs the expanded image light through the holographic Bragg grating toward an eyebox. The controller controls the scanning of the light source assembly and the scanning waveguide based on display instructions to form a two-dimensional image.

In conventional waveguide displays, the occurrence of total internal reflection (TIR) inside an optical waveguide limits the range of propagation angles, which shrinks further after diffraction by the presence of a diffraction grating. For example, an output waveguide composed of fused silica with a refractive index of 1.46 can support the propagation angles in the range of 43° to 75° inside the output waveguide, where 43° is the critical angle and 75° is a threshold value above which a pupil replication density becomes too sparse. In some configurations, the difference of 32° in the range of propagation angles can become only 16° after diffraction.

Conventional waveguide displays with surface-relief gratings not only diffract the image light, but also diffract the external light coming from outside the waveguide display. This results in the generation of ghost images in the waveguide display. For example, the image of the sun might appear in the FOV of the waveguide display. Further, the coupling of image light from the light source assembly is done by the diffraction grating in order to pre-dispense the image light, which will be compensated by the diffraction grating when partially coherent light source is used. The in-coupling efficiency of such waveguide displays is substantially low (e.g. <30%) due to the light leakage when bounced back from the bottom of the output waveguide and biased efficiency between s and p polarizations.

In contrast, the optical waveguide in the current disclosure achieves the range of propagation angles for the occurrence of TIR with a substantially larger FOV. For example, the FOV of the waveguide display can be within a range of −16° to +16°. Further, because of the Bragg condition matching, ghost images of the external light is substantially lower. The addition of volume Bragg grating in the waveguide display may also support multiple channels in a single output waveguide via multiple holographic exposures on a recording media. Also, the in-coupling of the image light may be done directly through a glass surface in the absence of any grating element, and thus the in-coupling efficiency of the optical waveguide may be at least 90% for any polarization of the light. FIG. 1 is a diagram of a near-eye-display (NED) 100, in accordance with an embodiment. In some embodiments, the NED 100 may be referred to as a head-mounted display (HMD). The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIG. 2, the display 110 includes at least one display assembly (not shown) for directing image light to an eye of the user. The display assembly includes an output waveguide with a holographic Bragg grating generated using a plurality of exposures within a recording band (e.g. ultra-violet light with wavelength ranging from 10 nm to 400 nm), as described in detail below in conjunction with FIGS. 5-6.

Figure 2:
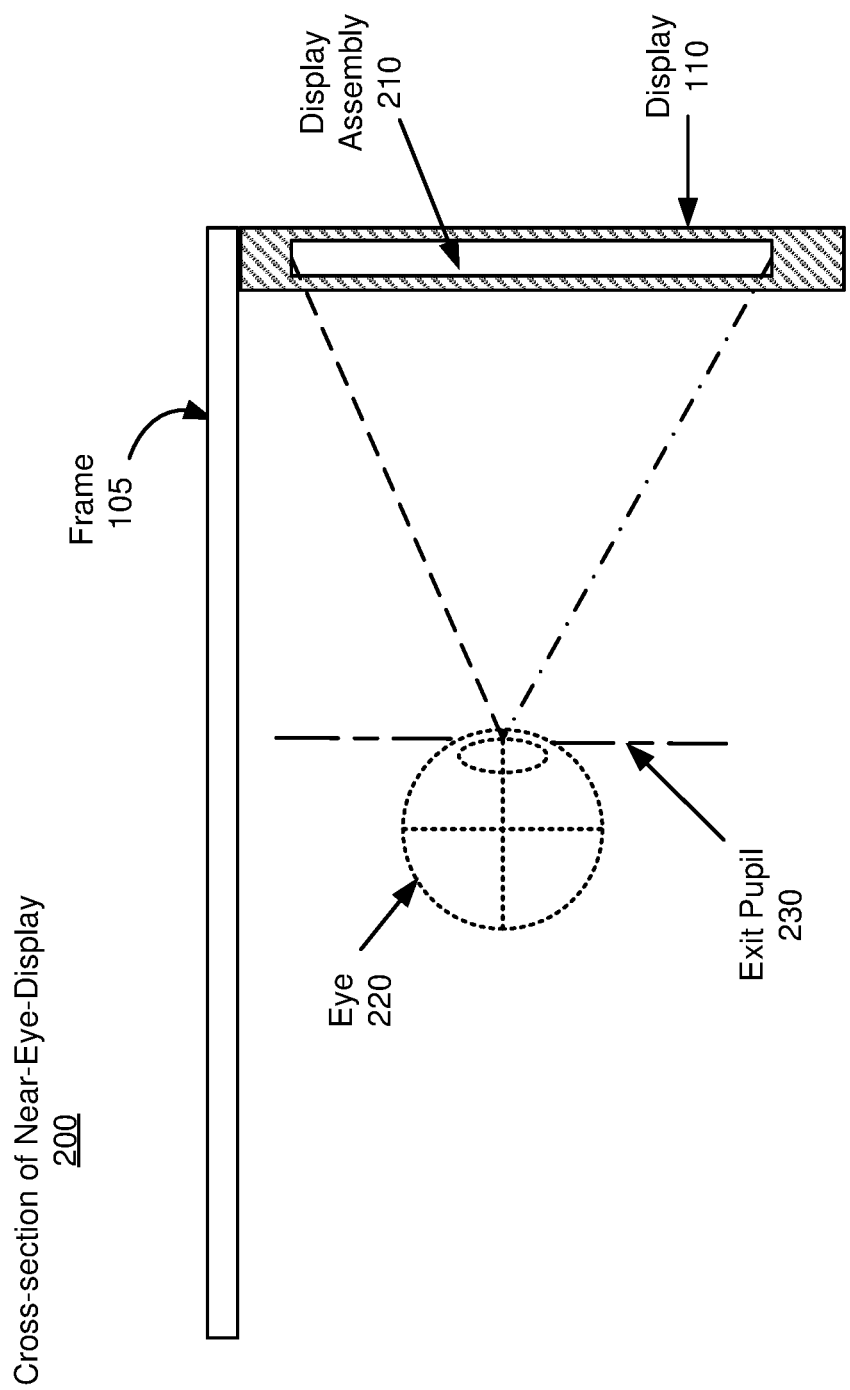
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one display assembly 210. An exit pupil 230 is a location where the eye 220 is positioned in an eyebox region when the user wears the NED 100. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to an eyebox located at an exit pupil of another eye 220 of the user.

The display assembly 210, as illustrated below in FIG. 2, is configured to direct the image light to an eyebox located at an exit pupil 230 of the eye 220. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the waveguide display assembly 210, magnify image light emitted from the waveguide display assembly 210, some other optical adjustment of image light emitted from the waveguide display assembly 210, or some combination thereof. The example for optical elements may include an aperture, a Fresnel lens, a convex lens, a concave lens, a filter, or any other suitable optical element that affects image light. The display assembly 210 includes an output waveguide with a holographic Bragg grating generated using a plurality of exposures within a recording band (e.g. ultra-violet light with wavelength ranging from 10 nm to 400 nm), as described in detail below in conjunction with FIGS. 5-6.

Figure 3:
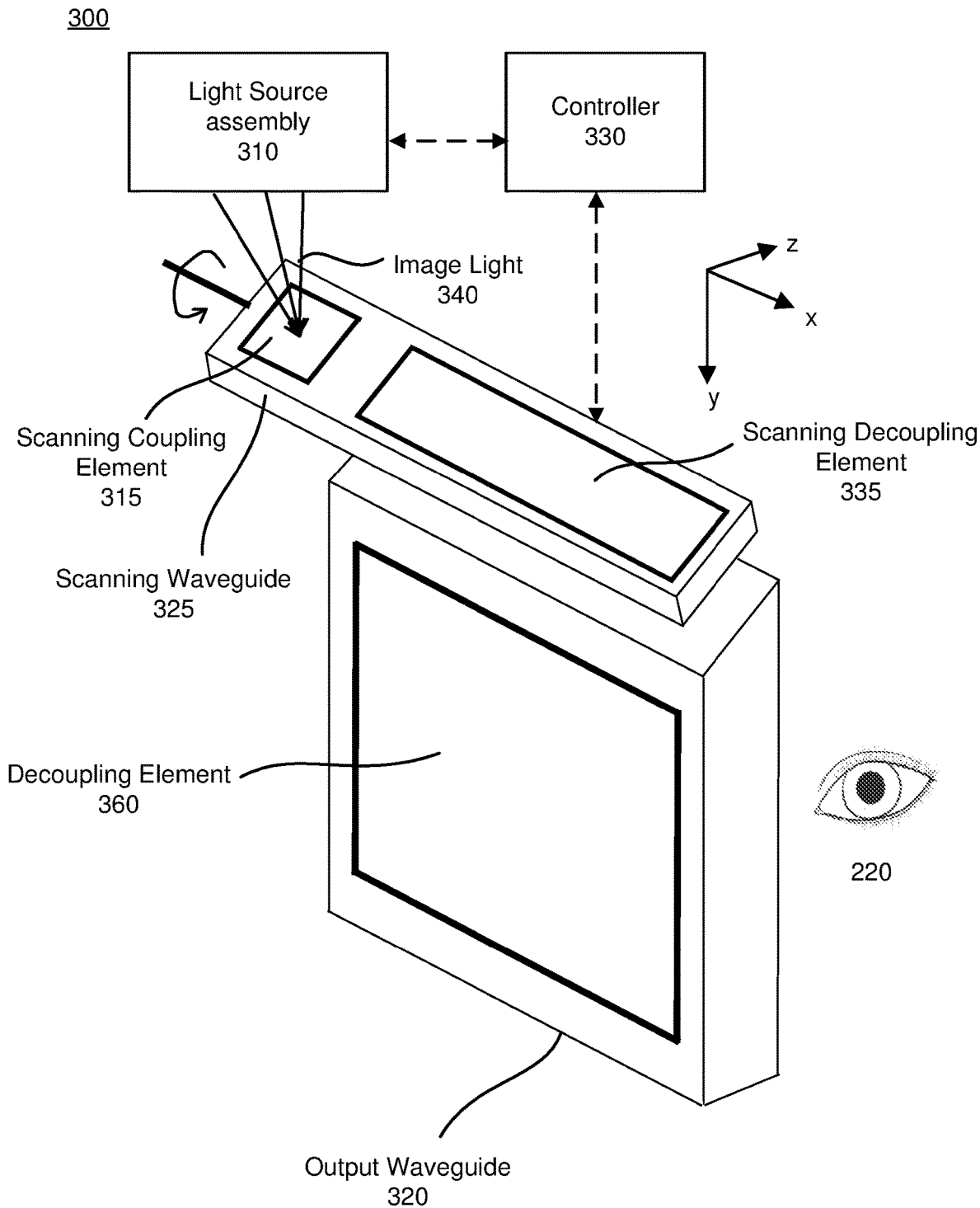
FIG. 3 illustrates an isometric view of a waveguide display with a light source assembly and a scanning waveguide, in accordance with an embodiment.

FIG. 3 illustrates an isometric view of a waveguide display 300 with a light source assembly and a scanning waveguide, in accordance with an embodiment. In some embodiments, the waveguide display 300 is a component (e.g., display assembly 210) of the NED 100. In alternate embodiments, the waveguide display 300 is part of some other NED, or other system that directs display image light to a particular location.

The waveguide display 300 includes a light source assembly 310, an output waveguide 320, a scanning waveguide 325, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The light source assembly 310 generates image light 340. The light source assembly 310 includes an optical source, and an optics system (not shown here). The optical source is a source of light that generates at least a coherent or partially coherent image light. The optical source may be, e.g., a light emitting diode, a tunable laser, a MicroLED, a superluminous LED (SLED), or some other light source that emits partially coherent light. The optical source emits light in a visible band (e.g., from about 390 nm to 700 nm), and it may emit light that is continuous or pulsed.

The light source assembly 310 emits image light 340 in accordance with one or more illumination parameters received from the controller 330. An illumination parameter is an instruction used by the light source assembly 310 to generate light. An illumination parameter may include, e.g., restriction of input wave vector for total internal reflection, restriction of input wave vector for maximum angle, source wavelength, pulse rate, pulse amplitude, beam type (continuous or pulsed), other parameter(s) that affect the emitted light, or some combination thereof. The optics system includes one or more optical components that condition the light from the light source assembly 310. Conditioning light from the light source assembly 310 may include, e.g., expanding, collimating, adjusting orientation in accordance with instructions from the controller 330, some other adjustment of the light, or some combination thereof. The one or more optical components may include, e.g., lenses, liquid lens, mirrors, apertures, gratings, or some combination thereof. The light source assembly 310 generates and outputs image light 340 to the scanning waveguide 325.

The scanning waveguide 325 is an optical waveguide. The scanning waveguide 325 may be composed of one or more materials that facilitate total internal reflection of the image light 340. The scanning waveguide 325 may be composed of e.g., silicon, plastic, glass, or polymers, a material with an index of refraction between 1.4 and 2.0, or some combination thereof. The scanning waveguide 325 has a relatively small form factor. For example, the scanning waveguide 325 may be approximately 50 mm long along X-dimension, 3 mm wide along Y-dimension, and 0.3-1 mm thick along Z-dimension.

The scanning waveguide 325 includes a scanning coupling element 315 and a scanning decoupling element 335. The scanning waveguide 325 receives the image light 340 emitted from the light source assembly 310 at the scanning coupling element 315. The scanning coupling element 315 couples the image light 340 from the light source assembly 310 into the scanning waveguide 325. The scanning coupling element 315 may be, e.g., a surface-relief grating, a diffraction grating, a holographic grating, one or more cascaded reflectors, one or more prismatic surface elements, an array of holographic reflectors, or some combination thereof. In some configurations, the waveguide display 300 may include a plurality of scanning waveguides 325 that are stacked together, and each of the scanning coupling elements 315 in the corresponding scanning waveguide 325 may have substantially the same area along the X-axis and the Y-axis dimension, and are separated by a distance along the Z-axis. The pitch of the scanning coupling element 315 may be 300-600 nm.

The scanning decoupling element 335 decouples the total internally reflected image light from the scanning waveguide 325. The scanning decoupling element 335 may be, e.g., a surface-relief grating, a diffraction grating, a holographic grating, some other element that decouples image light out of the scanning waveguide 325, or some combination thereof. For example, in embodiments where the scanning decoupling element 335 is a diffraction grating, the pitch of the diffraction grating is chosen to cause incident image light to exit the scanning waveguide 325. An orientation of the image light exiting from the scanning waveguide 325 may be altered by varying the orientation of the image light exiting the light source assembly 310, varying an orientation of the light source assembly 310, or some combination thereof. For example, the pitch of the diffraction grating may be in the range of 300 nm to 600 nm.

In some embodiments, the scanning decoupling element 335 has an extended length in the direction of propagation of an image light trapped inside the scanning waveguide 325. The scanning decoupling element 335 may represent an exit pupil of the scanning waveguide 325. The dimension of the exit pupil may be limited by the optics system in the light source assembly 310. In some configurations, the scanning coupling element 315 and the scanning decoupling element 335 may have the same dimensions in order to capture at least some of the image light 340 coupled in to the scanning waveguide 325.

The image light exiting the scanning waveguide 325 is expanded at least along one dimension (e.g., may be elongated along X-axis). The image light couples to the output waveguide 320, as described below in detail with reference to FIG. 4.

The output waveguide 320 is an optical waveguide that outputs image light to an eye 220 of a user. The output waveguide 320 receives the image light from the scanning waveguide 325, and guides the received input image light to a decoupling element 360, as described below in detail in conjunction with FIG. 4. The decoupling element 360 redirects the total internally reflected image light from the output waveguide 320 to an eyebox located in the exit pupil of the user's eye 220. The decoupling element 360 is part of, or affixed to the output waveguide 320. The decoupling element 360 may be, e.g., a holographic grating. An orientation and position of the image light exiting from the output waveguide 320 is controlled by changing an orientation and position of the image light entering the output waveguide 320. The pitch of the decoupling element 360 may be 300-600 nm.

The output waveguide 320 may be composed of one or more materials that facilitate total internal reflection of the received image light. The output waveguide 320 may be composed of e.g., silicon, plastic, glass, or polymers, or some combination thereof. The output waveguide 320 has a relatively small form factor. For example, the output waveguide 320 may be approximately 50 mm wide along X-axis, 30 mm long along Y-axis and 0.3-1 mm thick along Z-axis.

In the embodiment of FIG. 3, the output waveguide 320 includes a top surface extending along the X-Y plane, a bottom surface extending along the X-Y plane, and an input surface extending along the X-Z plane with an angle of inclination with respect to the X-Y plane, and located in between the top surface and the bottom surface. In alternate embodiments, the output waveguide 320 includes the top surface, the bottom surface, and one or more input surfaces located in between the top surface and the bottom surface. Each of the input surfaces of the output waveguide 320 may include a slant angle in the range of 30 degrees to 60 degrees, and the slant angle is determined based on a target FOV and/or the refractive index of a material forming the output waveguide 320.

In alternate embodiments, the output waveguide 320 includes an index matched prism (not shown here) located on the top surface extending along the X-Y plane. The index matched prism has a target slant angle determined such that the index matched prism guides the received input image light based on the occurrence of total internal reflection within the output waveguide 320.

The controller 330 controls the scanning operations of the light source assembly 310. The controller 330 determines scanning instructions for the light source assembly 310. The scanning instructions are generated based at least on the one or more display instructions generated by the controller 330. Display instructions are instructions to render one or more images. In some embodiments, display instructions may simply be an image file (e.g., bitmap). Scanning instructions are instructions used by the light source assembly 310 to generate image light 340. The scanning instructions may include, e.g., a type of a source of image light (e.g. monochromatic, polychromatic), a scanning rate, an orientation of a scanning apparatus, one or more illumination parameters or some combination thereof. The controller 330 includes a combination of hardware, software, and/or firmware not shown here so as not to obscure other aspects of the disclosure.

In a different embodiment, the waveguide display 300 includes a scanning mirror (not shown here), the light source assembly 310, the output waveguide 320, the scanning waveguide 325, and the controller 330. The scanning waveguide 325 (also referred to as a "first waveguide") is at a fixed orientation with respect to the output waveguide 320, and the scanning mirror performs a rotational movement in order to scan the image light exiting the scanning waveguide 325. The scanning mirror may be approximately 50 mm long along the X-dimension.

The scanning waveguide 325 receives the image light 340 emitted from the light source assembly 310 at the scanning coupling element 315. The scanning coupling element 315 couples the image light 340 from the light source assembly 310 into the scanning waveguide 325. The scanning decoupling element 335 decouples the total internally reflected image light from the scanning waveguide 325. The image light exiting the scanning waveguide 325 is expanded at least along one dimension (e.g., may be elongated along X-axis).

The image light from the scanning waveguide 325 couples to the scanning mirror. The scanning mirror reflects the received image light to the plurality of input surfaces of the output waveguide 320, as described below in detail with reference to FIG. 4.

Figure 4:
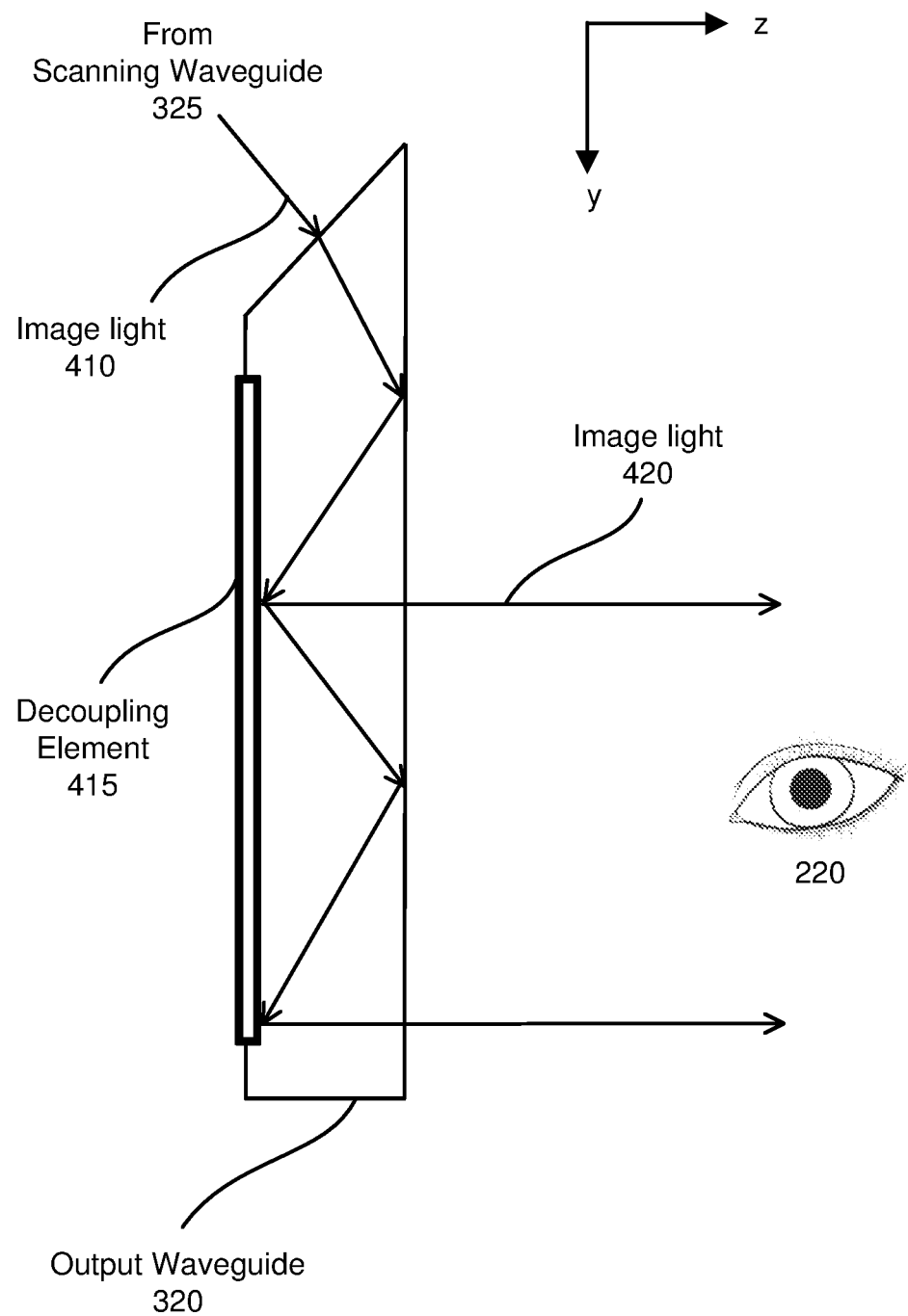
FIG. 4 illustrates a cross-section of the waveguide display of FIG. 3, in accordance with an embodiment.

FIG. 4 illustrates a cross-section of the waveguide display of FIG. 3, in accordance with an embodiment. The cross section 400 of the waveguide display 300 includes the output waveguide 320.

The scanning waveguide 325 emits image light 410 toward the output waveguide 320. The output waveguide 320 receives the image light 410 at one or more coupling elements (not shown here). The coupling element couples the image light 410 from the scanning waveguide 325 into the output waveguide 320. In embodiments where the coupling element is diffraction grating, the pitch of the diffraction grating is chosen such that total internal reflection occurs, and the image light 410 propagates internally toward the decoupling element 415. For example, the pitch of the coupling element may be in the range of 300 nm to 600 nm.

The decoupling element 415 redirects the image light 420 toward an eyebox located in the exit pupil of the user's eye 220. In embodiments where the decoupling element 415 is a diffraction grating, the pitch of the diffraction grating is chosen to cause incident image light 410 to exit the output waveguide 320 at a specific angle of inclination to the surface of the output waveguide 320. An orientation of the image light exiting from the output waveguide 320 may be altered by varying the orientation of the image light exiting the scanning waveguide 325, varying an orientation of the scanning waveguide 325, or some combination thereof. For example, the pitch of the decoupling element 415 may be in the range of 300 nm to 600 nm.

The image light 420 exiting the output waveguide 320 is expanded at least along one dimension (e.g., may be elongated along Y-dimension). The image light 420 couples to the human eye 220.

In another embodiment, the waveguide display 300 includes two or more decoupling elements 415. For example, the decoupling element 415 may include multiple decoupling elements located side by side with an offset. In another example, the decoupling element 415 may include multiple decoupling elements stacked together to create a two-dimensional decoupling element. In some configurations, the image light 420 can couple to the user's eye 220 as a multi-planar display. For example, the image light 420 may include a display along at least two of the X-Y plane, Y-Z plane, and the X-Z plane.

The waveguide display of FIG. 4 shows an example with a single scanning waveguide 325 receiving a monochromatic beam of image light 410 from the light source assembly 310. In alternate embodiments, the waveguide display 300 includes a plurality of scanning waveguides 325. Each of the scanning waveguide 325 may be stacked together with a distance of separation to output an expanded image light 410 that is multi-colored. The scanning waveguides are stacked such that image light (e.g., 410) from each of the stacked waveguides occupies a same area of the exit pupil of the stacked waveguide display.

In an alternate embodiment, the scanning waveguide 325 (also referred to as a "first waveguide") emits image light 410 to a scanning mirror. The scanning waveguide 325 may be positioned at a fixed orientation and the scanning mirror performs a rotational movement along the Y-Z plane. The scanning mirror redirects the image light 410 received from the scanning waveguide 325 toward the output waveguide 320.

Figure 5:
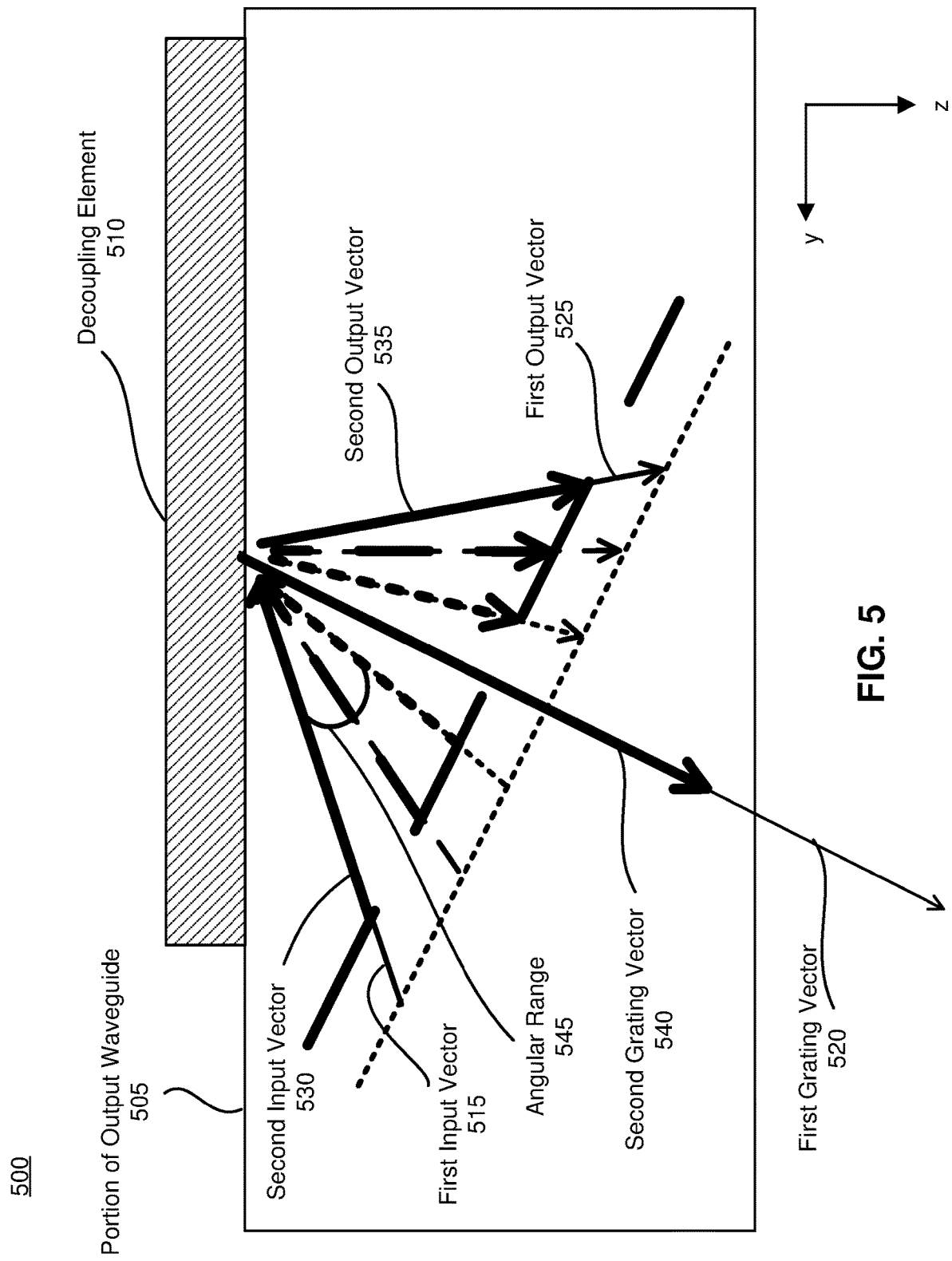
FIG. 5 illustrates a cross-section of a portion of the waveguide display of FIG. 3 including a holographic Bragg grating, in accordance with an embodiment.

FIG. 5 illustrates a cross-section 500 of a portion of the waveguide display of FIG. 3 including a holographic Bragg grating, in accordance with an embodiment. The cross-section 500 includes a portion of an output waveguide 505. The output waveguide 505 is an embodiment of the output waveguide 320 of FIG. 3. The output waveguide 505 includes a single decoupling element 510.

In the example of FIG. 5, the decoupling element 510 includes a holographic Bragg grating generated using a first exposure with a corresponding first input vector 515, a first grating vector 520, and, a first output vector 525, and a second exposure with a corresponding second input vector 530, a second output vector 535, and a second grating vector 540. The example of FIG. 5 shows how the first exposure and the second exposure cover a single incident angular range 545 with a plurality of bands of light.

In the example of FIG. 5, the first exposure diffracts an incident light with an incident angular range 545 of 43 to 75 degrees. Note that the cross-section 500 shows only three rays that are incident on the decoupling element 510 as an example. The incident angle corresponding to each of the three rays is related to a specific wavelength determined based on the geometry of the decoupling element 510. In some configurations, the specific wavelength of the incident light is determined based on the length of the second input vector 530. Similarly, the second exposure diffracts the same incident angular range 545, but each incident angle is associated with a second set of wavelengths different from the first exposure.

Accordingly, with a plurality of exposures with a plurality of lengths (or pitches) of the corresponding grating vectors, the holographic Bragg grating inside the output waveguide 505 diffracts a continuous range of the incident light (e.g. 43 to 75 degrees). Also, for a given angle of incidence, the holographic Bragg grating supports discrete sets of wavelengths for each incident angle including at least one of the first band, the second band, and the third band. Note that such a holographic Bragg grating mitigates the occurrence of ghost images in the image light decoupled from the output waveguide 505 as the incident image light perfectly satisfies the Bragg condition matching inside the body of the output waveguide 505.

In alternate embodiments, the output waveguide 505 includes a plurality of holographic Bragg gratings that work independently without interfering with each other. For example, when the output waveguide 505 may include two holographic Bragg gratings recorded for two different Bragg wavelengths and the same incident angle, the output waveguide 505 can diffract the two different Bragg wavelengths into different output directions with a substantially lower crosstalk.

Note that, in conventional waveguide displays, each exposure on a holographic media diffracts very narrow range of incidence angles as the range is determined by the thickness of a material used for the output waveguide. For example, the range may be around $\frac{1}{60}°$ in order to match the resolution of the user's eyes to which the waveguide display presents a viewable media. In order for the Bragg grating to support incident angles in the range of 43° to 75°, a plurality of exposures with a slightly different Bragg condition matching may be performed. For example, if each exposure supports a range of $\frac{1}{60}°$, a total of $60*(75-43)=1,920$ exposures may be performed. The performance of a plurality of exposures reduces the diffraction efficiency of the waveguide display to a substantially low value (e.g. 1-5%). In contrast, with a plurality of exposures (e.g. 10-20 exposures) at a few discrete and sparse incident angles, the waveguide display of FIG. 3 may cover a range of incident angles of at least 40°, and accordingly, results in a diffraction efficiency of at least 10%.

Figure 6:
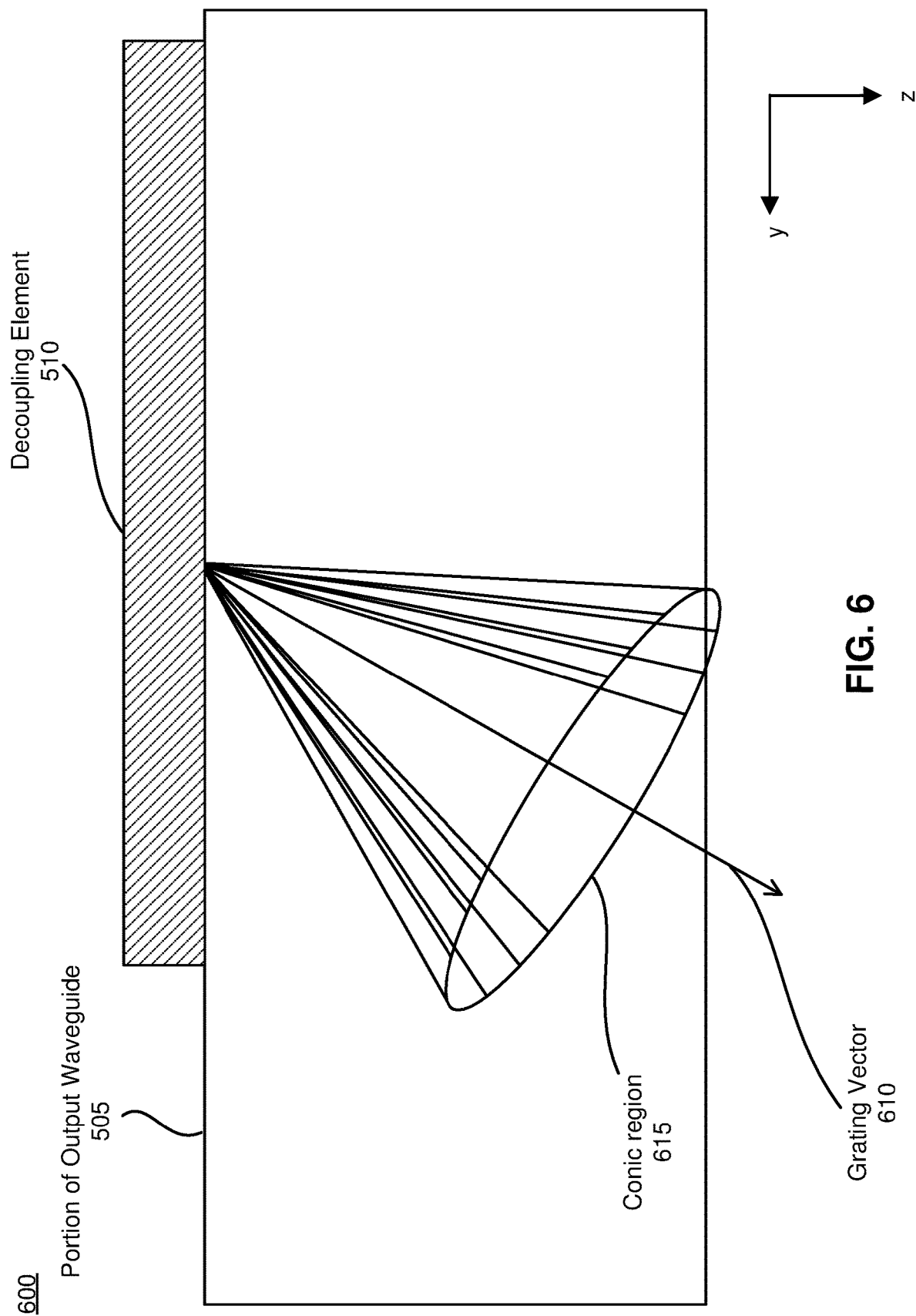
FIG. 6 illustrates a cross-section of a portion of the waveguide display of FIG. 3 including a holographic Bragg grating generated with a single exposure at a plurality of conic angles, in accordance with an embodiment.

FIG. 6 illustrates a cross-section of a portion 600 of the waveguide display of FIG. 3 including a holographic Bragg grating generated with a single exposure at a plurality of conic angles, in accordance with an embodiment. The cross-section of the portion 600 includes a portion of the output waveguide 505 of FIG. 5.

In the example of FIG. 6, the decoupling element 510 includes a holographic Bragg grating generated using one or more exposures with a plurality of two-dimensional incident angles along the Y-axis and the Z-axis. The number of exposures that generate the holographic Bragg grating depends on the refractive index of the output waveguide 505. In one example, the holographic Bragg grating is generated using at most ten exposures. The two-dimensional incident angles together form a conic region 615 associated with a grating vector 610. The grating vector 610 is an embodiment of the grating vector 530 of FIG. 5. As shown in FIG. 6, there is a single angle of incidence for a specific wavelength of the incidence light (depicted by the length of the input vector) that the grating vector 610 supports. The angle between the angle of incidence and the grating vector 610 determines a half cone angle of the conic region 615. Accordingly, any image light incident on the output waveguide 505 with the half cone angle from the grating vector 610 can be diffracted efficiently. Any image light incident on the output waveguide 505 with a different half cone angle and a different wavelength can also be diffracted efficiently.

Note that the example of FIG. 6 shows a holographic Bragg grating formed with a wider range of two-dimensional incident angles at a specific wavelength of the incident light and a substantially lower number of exposures as compared to the holographic Bragg grating of FIG. 5. Accordingly, the mitigation of ghost images in the viewable media presented to the user's eyes is substantially higher when compared to the embodiment of FIG. 5.

Figure 7:
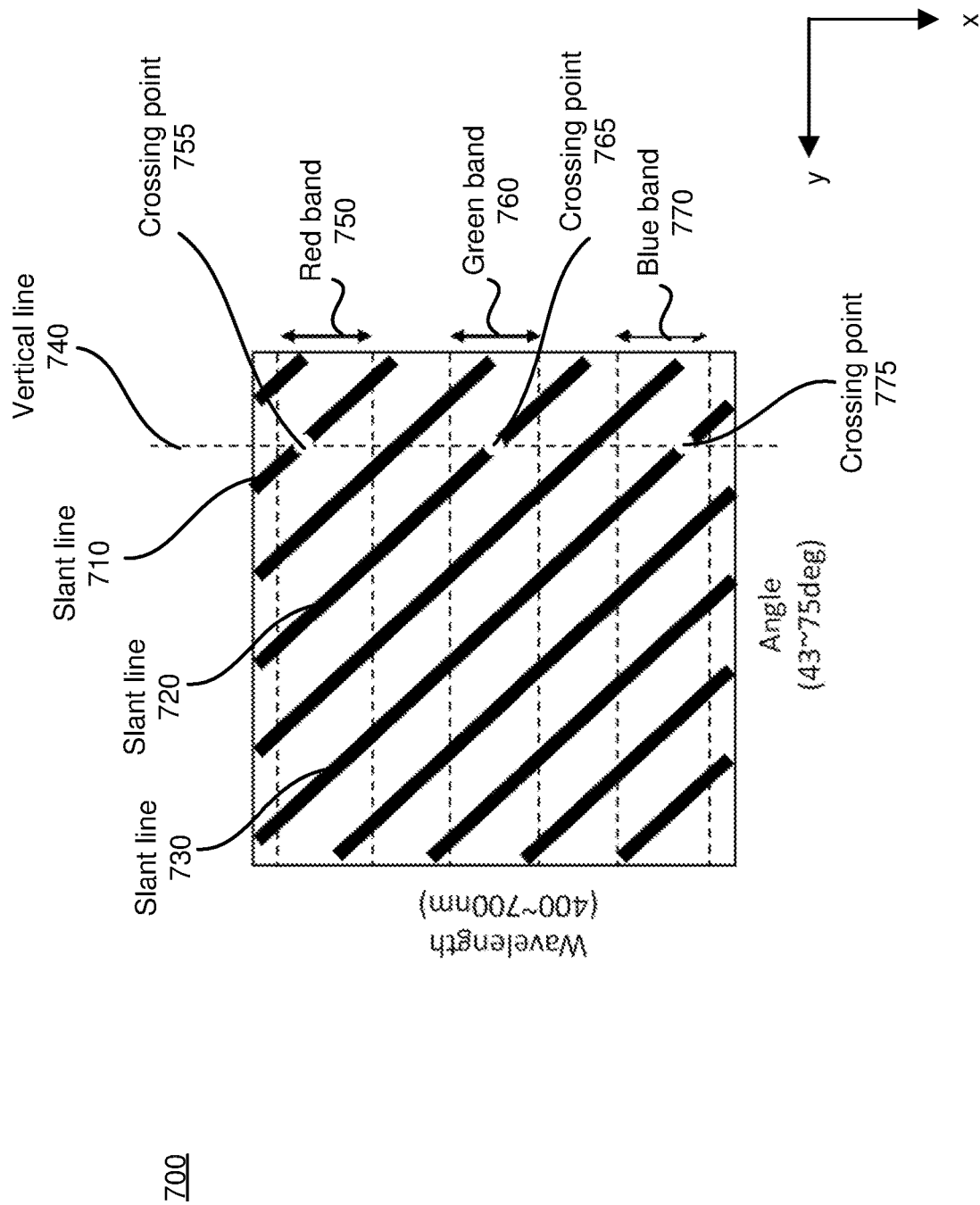
FIG. 7 illustrates a two-dimensional plot of Bragg conditions from a plurality of exposures as a function of a wavelength and an angle of incidence of image light generated by the waveguide display of FIG. 3, in accordance with an embodiment.

FIG. 7 illustrates a two-dimensional plot of Bragg conditions from a plurality of exposures as a function of a wavelength and an angle of incidence of image light generated by the waveguide display of FIG. 3, in accordance with an embodiment. As shown in FIG. 7, the two-dimensional plot 700 includes a slant line 710, a slant line 720, a slant line 730, a vertical line 740, a red band 750, a green band 760, and a blue band 770. In the example of FIG. 7, each of the red band 750, the green band 760, and the blue band 770 correspond to a specific band of wavelengths of the image light in the range of 400 to 700 nm.

Each of the slant lines 710, 720, and 730 represent a supporting wavelength and a range of incident angles from a Bragg condition matching. Each of the slant lines 710, 720, and 730 should be separated without any overlap. In order to do this, each Bragg grating vector, as described above with reference to FIGS. 5 and 6, is parallel to each other, and only the pitch of the diffraction grating is different between different exposures and/or between different Bragg grating vectors. The slant line 720 corresponds to a diffraction grating with a smaller pitch when compared to the slant line 710. Similarly, the slant line 730 corresponds to a diffraction grating with a smaller pitch when compared to the slant line 710 and the slant line 720. The vertical line 740 corresponds to an angle of incidence with multiple exposures in which there is at least a crossing point 755 in the red band 750, a crossing point 765 in the green band 760, and a crossing point 775 in the blue band 770. Accordingly, with the multiplexing of exposures in the volume Bragg grating of the waveguide display of FIG. 3, there is at least one crossing point for each of the red band 750, the green band 760, and the blue band 770 corresponding to a target FOV. This way, a single output waveguide can support each of the color channels in the waveguide display of FIG. 3 with a substantially wider FOV.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. A waveguide, comprising:
  a waveguide body including:
    a top surface,
    a bottom surface that is opposite to the top surface,
    one or more input surfaces, and
    a holographic Bragg grating including a plurality of exposures, the plurality of exposures associated with a Bragg condition matching of an image light with a plurality of wavelengths and the image light is incident at a plurality of incident angles on the waveguide body;
  a plurality of input areas located along the one or more input surfaces, each of the plurality of input areas configured to receive the image light from a light source assembly, the received image light including light within a first band and light within a second band different from the first band; and
  an output area located along the bottom surface,
  wherein the holographic Bragg grating is configured to diffract light in the first band and light in the second band incident over a first range of angles to a same angle toward an eyebox.

2. The waveguide of claim 1, wherein the holographic Bragg grating is configured to expand the received image light with a threshold value of diffraction efficiency corresponding to a range of incident angles of the image light.

3. The waveguide of claim 1, wherein the holographic Bragg grating is associated with a volume in the range of 1 to 100 microns corresponding to the diffraction efficiency in the range of 1 to 99%.

4. The waveguide of claim 1, wherein the first band and the second band are in a visible band of light.

5. A near-eye display, comprising:
 a light source assembly configured to emit image light that is at least partially coherent, and the image light including light within a first band and a light within a second band that is different from the first band;
 a first waveguide including an entrance area and an exit area, the first waveguide configured to receive the image light from the light source assembly at the entrance area, expand the image light in at least a first dimension, and output a first expanded image light from the exit area;
 an output waveguide including a holographic Bragg grating including a plurality of exposures, the plurality of exposures associated with a Bragg condition matching of an image light with a plurality of wavelengths and the image light is incident at a plurality of incident angles on the waveguide body, the output waveguide further including an output area along a first plane, and a plurality of input areas along a second plane different from the first plane, each of the plurality of input areas configured to receive the expanded image light from the first waveguide, the output waveguide configured to expand the first image light at least along the second dimension to form a second expanded image light, and the holographic Bragg grating configured to output the second expanded image light toward an eyebox; and
 a controller configured to generate the display instructions and provide the display instructions to the light source assembly,
 wherein the holographic Bragg grating is configured to diffract light in the first band and light in the second band incident over a first range of angles to a same angle to output an outgoing image light toward the eyebox.

6. The near-eye display of claim 5, wherein the holographic Bragg grating diffracts light in the first band incident at a first angle and light in the second band incident at a second angle to a corresponding angle in the second range of angles, the first angle and the second angle in the first range of angles.

7. The near-eye display of claim 5, wherein each of the plurality of input areas is associated with a slant angle determined based at least in part on a target field-of-view (FOV) of the near-eye-display and a refractive index of a material forming the output waveguide.

8. The near-eye display of claim 5, wherein the holographic Bragg grating is configured to expand the first expanded image light with a threshold value of diffraction efficiency corresponding to a range of incident angles of the first expanded image light outputted by the first waveguide.

9. The near-eye-display of claim 5, wherein the holographic Bragg grating is configured to expand the first expanded image light with a threshold value of diffraction efficiency corresponding to a range of incident angles of the image light.

10. The near-eye-display of claim 5, wherein the holographic Bragg grating is associated with a volume in the range of 1 to 100 microns corresponding to the diffraction efficiency in the range of 1 to 99%.

11. The near-eye-display of claim 5, wherein the first band and the second band are in a visible band of light.

12. The near-eye display of claim 5, wherein the first waveguide is a scanning waveguide.

13. The near-eye display of claim 5, wherein the first waveguide further comprises a surface-relief grating configured to expand the image light in at least the first dimension.

14. The near-eye-display of claim 5, further comprising:
 a scanning mirror configured to receive the first expanded image light from the first waveguide and reflect a scanned image light, the scanning mirror extending along the first dimension.

15. The near-eye display of claim 5, wherein the first waveguide is positioned at a fixed orientation with respect to the output waveguide.

* * * * *